United States Patent [19]
Brooks et al.

[11] Patent Number: 5,637,342
[45] Date of Patent: Jun. 10, 1997

[54] METHOD FOR COOKING BACON

[75] Inventors: Coralie G. Brooks, Petaluma, Calif.;
David L. Shaft, Green Bay, Wis.

[73] Assignee: Schreiber Foods, Inc., Green Bay, Wis.

[21] Appl. No.: 484,998

[22] Filed: Jun. 7, 1995

[51] Int. Cl.$^6$ .................................................. A23L 1/00
[52] U.S. Cl. ........................ 426/523; 426/438; 426/510
[58] Field of Search .............................. 426/510, 523, 426/438, 805; 99/330, 348, 408, 355; 366/149

[56] References Cited

U.S. PATENT DOCUMENTS

| | | | |
|---|---|---|---|
| 771,141 | 9/1904 | Gesner | 366/149 |
| 1,677,912 | 7/1928 | Bartleson | 426/510 |
| 4,225,630 | 9/1980 | Pitchon | 426/805 |

OTHER PUBLICATIONS

Blentech Corporation, "Continublend Cooker System", Santa Rosa, California.

*Primary Examiner*—George Yeung
*Attorney, Agent, or Firm*—Brinks Hofer Gilson & Lione

[57] ABSTRACT

An apparatus and method are provided for cooking bacon bits which uses a continuous cooker. Bacon and bacon fat are delivered to the cooker which uses an auger to move the bacon from one end of the cooker to the other. The cooker is heated, for example, using a steam supply to heat a jacket on the outside of the cooker. The auger moves the bacon and bacon fat from the beginning point of the cooker to the exit point of the cooker. The heated jacket provides the heat needed to cook the bacon. Steam is injected in the casing to bubble through the oil and product.

6 Claims, 1 Drawing Sheet

METHOD FOR COOKING BACON

BACKGROUND OF THE INVENTION

The present application relates generally to a method and apparatus of cooking bacon, and more particularly to a method and apparatus for cooking bacon bits in their own fat.

The popularity of pre-cooked bacon bits has provided a need for improved methods of manufacturing high quality, large volume pre-cooked bacon bits. A number of prior art methods are available for cooking bacon bits.

One method of commercially making bacon bits is to cook the bacon bits in a kettle in batches. Such cooked bacon bits have a fat content of about 15% and a moisture content of about 30%. This cooking process has a yield of about 20–25% for every pound of raw material. Although this method produces bacon bits with a relatively high moisture content, the yield is relatively low and the product has relatively low flavor. Additionally, for commercial production, a continuous process is preferable over this batch process.

Another technique used for cooking bacon bits is to cook the bacon bits in oil, either vegetable oil or bacon fat. The product cooked using this technique produces a finished product which has a very good taste since it cooks in oil. However, this cooking technique has the problem of nitrosamine formation. This results in cooking bacon in bacon fat which is heated to high temperatures over long periods of time (for example, 375° F. over more than four hours). Bacon fat heated to these high temperatures for these long periods of time results in the breakdown of the nitrite in the bacon fat, thereby resulting in the high nitrosamine formation. This is a concern since nitrosamines are considered carcinogenic. In addition, this technique results in a product with relatively low moisture content and a relatively low yield.

Another available method of cooking bacon, including bacon bits, uses a microwave technique. For example, a method of cooking bacon using microwave techniques is disclosed in U.S. Pat. No. 4,957,756 (Olander et al).

Microwave techniques have the advantage of being able to cook the bacon in a continuous process. The resultant product also has good flavor. The product which results from such microwave cooking, however, has a fat content of about 40% and a moisture content of about 10% (relatively low). This process also has a yield of about 20–25% for every pound of raw material (relatively low).

Therefore, in view of the above, it is an object of the present invention to provide a low cost, high yield method of cooking bacon bits in a continuous process.

It is a further object of the present invention to provide a continuous method and apparatus for cooking bacon bits which will result in bacon bits having good taste without the dangers of high nitrosamine formations.

SUMMARY OF THE INVENTION

To achieve the foregoing and other objects of the present invention, an apparatus and method are provided for cooking bacon bits which uses a continuous cooker. Bacon ends and pieces and bacon fat or other oil are delivered to the cooker which uses a continuous pushing member, such as an auger, to move the bacon from one end of the cooker to the other. The cooker is heated, for example, using a steam supply to heat a jacket on the outside of the cooker. The continuous moving member moves the bacon and bacon fat from the beginning point of the cooker to the exit point of the cooker. The heated jacket provides the heat needed to cook the bacon.

Since the auger moves the bacon fat as well as the bacon, the bacon bits are cooked in bacon fat. The bacon fat, however, is continuously renewed, avoiding the heating of the bacon fat to high temperatures for long periods of time.

DETAILED DESCRIPTION OF THE PRESENTLY PREFERRED EMBODIMENTS

Figure 1:
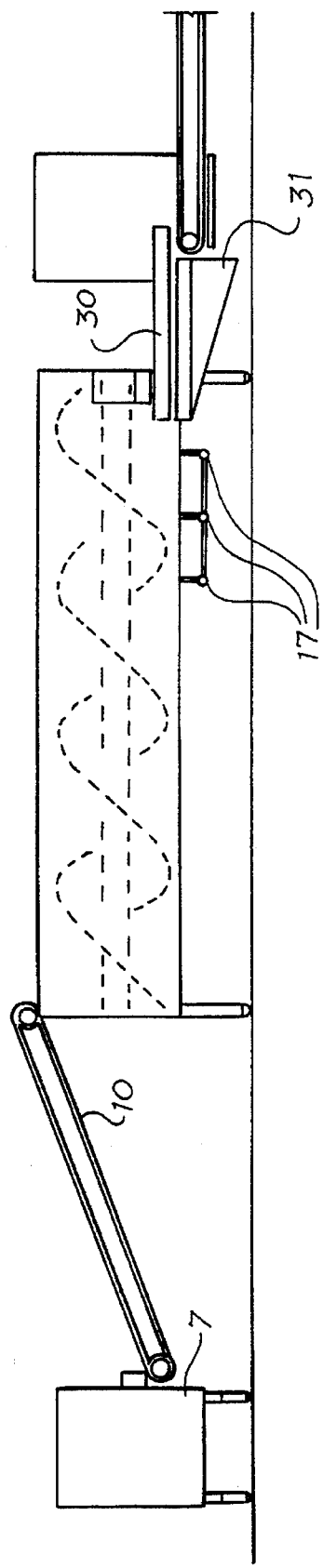
FIG. 1 shows a schematic top view of a preferred embodiment of the continuous bacon cooker of the present invention.
Figure 2:
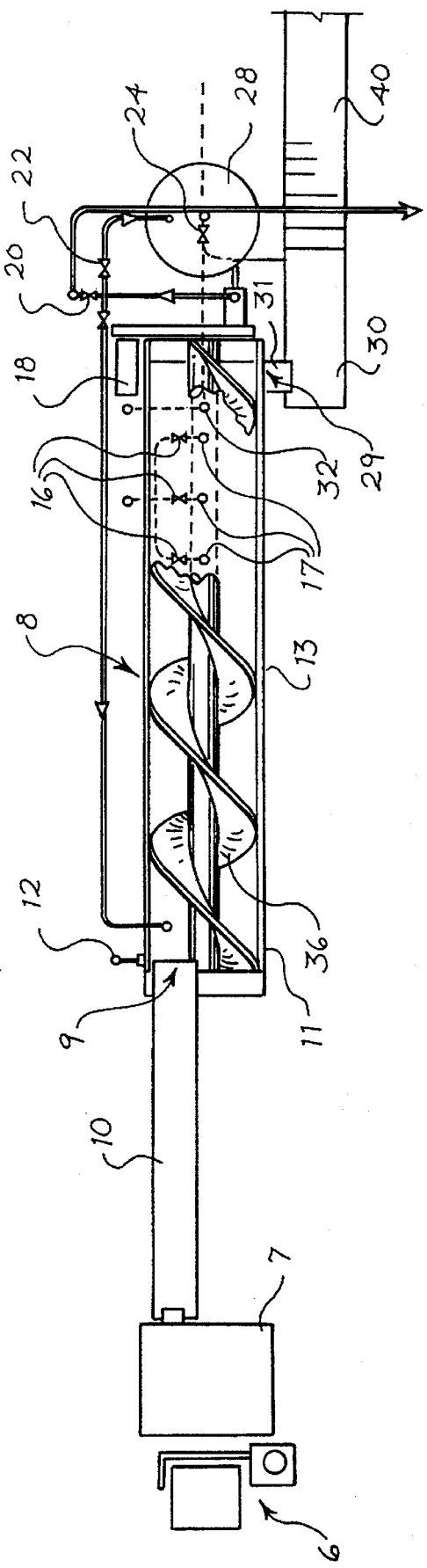
FIG. 2 shows a side view of the embodiment of FIG. 1.

Referring now to FIGS. 1 and 2, a preferred embodiment of the method and apparatus for cooking bacon bits is disclosed. First, bacon ends and pieces are dumped into a grinder 7 with any suitable means, such as with a bucket dumper 6. The bacon ends and pieces are then ground using a grinder 7. A suitable grinder is a Risco TRL 160 angle grinder available from Kutter (Avon, Mass.). This grinder is used to grind the bacon ends and pieces to about one-quarter inch pieces. It will be appreciated that ends and pieces (such as broken slice salvage) can also be cooked with the present invention. The pieces are then moved to the continuous cooker for cooking. The ground pieces are first continuously delivered to the cooker via a screw conveyor 10. The screw conveyor 10 receives the ground pieces and moves them to the inlet 9 of the continuous cooker 8. The raw bacon is delivered at a continuous rate (i.e., 50 lb./min.) to preheated fat or oil (the terms "fat" and "oil" are used hereinafter interchangeably) in the continuous cooker 8.

The continuous cooker 8 comprises a casing 13, an auger 36 and a heater for heating the bacon product inside of the casing 13. In the preferred embodiment, the heater comprises a steam supply which delivers steam to a jacket 11 which is formed on the outer surface of a stainless steel casing 13. The steam is fed through a jacket steam supply connection 12. The steam heats the outer surface of the casing 13 thereby providing heat for cooking the bacon materials inside the casing 13. Steam may be supplied at a temperature of between 250°–353° F. and preferably 307° F. at 60 psi for cooking bacon bits.

After the bacon is fed to the casing 13, the auger 36 continuously moves the continuous supply of bacon and the bacon fat in which the bacon is cooked from the inlet end 9 of the continuous cooker 8 to the outlet end 29 of the continuous cooker 8. The auger 36 moves the bacon and bacon fat from the inlet end to the outer end of the cooker at a rate sufficient for the bacon bits to fully cook. Thus, the fat or oil in the cooker 8 is constantly discharging.

In a preferred embodiment, the cooker is 20 feet long and the steam heats the bacon fat and the bacon bits inside of the casing 13 to a temperature of 260° F. In this embodiment, the auger is rotated at a rate of 6 rpm, thereby moving the bacon and fat at a linear rate of about 0.3 ft/min in order to fully cook the bacon bits.

In a preferred embodiment, in the last third of the cooker 8, includes a plurality of steam injectors 17 which connect to a plurality of corresponding valves 16. Culinary grade steam is bubbled through the steam injectors 17. The culinary grade steam is thus bubbled through the heated fat and the product which is being cooked. The steam is preferably injected at approximately 30 psi at a temperature of 274° F. Pumping or injecting the steam increases the moisture content in the end product and yield of the process. Additionally this provides an additional degree of control for the temperature of the fat and the moisture content of the end product. Since the moisture content of the end product, yield of the process and temperature of the fat are important variables, this arrangement provides significant advantages.

The cooker 8 also includes a condensate outlet 32 through which condensate which forms upon the surface of the casing 13 may exit.

The auger 36 is moved by means of a cooker drive 18 which may be, for example, (an electric motor). The auger moves the bacon bits and the oil to an outlet 31 where the bacon bits and oil are continuously fed to a shaker table which includes shaker screen 30 with an oil collection reservoir 31. The drained product is then continuously removed from the shaker screens.

The oil reservoir preferably includes sensors for indicating a low oil level and a high oil level. A valve is open in order to selectively pump the oil to an external storage, such as a truck, tank, etc., during production. The level sensor senses when the oil collection reservoir under the shaker screens is at a high level. At an indication that the oil level is high, oil is pumped out through valve from the reservoir during production.

The cooker also includes a holding tank 28 which is used to store oil from the cooker 8. Oil is pumped to the cooker 8 at the start of production through valve 24. Oil is pumped from the collection reservoir 30 to a discharge line through valve 20 during production through valve 26. A suitable tank is a tank about 450 gallons. At the end of the production, the oil from the cooker 8 is moved back to the tank through valve 22.

Thus, the auger moves the bacon bits through the continuous cooker 8 from the inlet end 9 to the outlet end 29. The cooked product is then transported for further processing via take away conveyor 40. The cooked product may then be chilled or otherwise further processed.

A suitable continuous cooker is available commercially from Blentech (Santa Rosa, Calif.) as a thermscrew cooker. The thermscrew cooker includes the steam jacket, the casing and the auger. In the preferred embodiment as discussed above, the steam injectors are added in the last third of the continuous cooker.

With the present invention, the bacon and the fat or oil are continuously moved by the auger. Since the fat or oil is constantly discharged, the bacon is not cooked in the same oil. This also avoids the heating of the oil for long time periods. The bacon bits, however, are cooked in bacon fat, thereby rendering a product which has a desirable taste. The resulting cooked brown bits having a relatively high moisture content and relatively high fat compared to bacon bits cooked using existing techniques. Since the oil is not heated for extended periods of time, the nitrosamine formation problem is avoided. Further, unlike batch cooking, the bacon bits are cooked in a continuous process which is desirable for commercial production of bacon bits. The cooking is accomplished using the products own rendered bacon fat as it cooks.

The foregoing description of the preferred embodiments of the present invention has been presented for purposes of illustration and description. The described embodiments are not intended to be exhaustive or to limit the invention to the precise form disclosed. Obviously, many modifications and variations are possible in light of the above teachings. For example, bacon slices or other forms of bacon can be cooked instead of bacon ends of pieces. Also, rather than being cooked in bacon fat, the bacon may be cooked in another animal fat or vegetable oil. Further, the bacon and oil can be added to the cooker at different points, although it is preferable to not heat the bacon until the oil has been added. The embodiments which were described were chosen in order to best explain the principals of the invention and its practical applications. It is intended that the scope of the invention be defined by the following claims, including all equivalents.

We claim:

1. A process for cooking bacon, the process comprising:

providing a casing for holding the bacon;

inserting bacon and oil into the casing at a first end;

continuously moving the bacon and the oil from the first end of the casing through the casing;

heating the casing to a temperature sufficient to cook the bacon to form bacon bits in the casing as the bacon is continuously moved through the casing;

continuously discharging the oil in which the bacon is cooked from the casing;

removing the bacon bits at an outlet end of the casing.

2. The process of claim 1 wherein the bacon and oil are continuously moved by using an auger.

3. The process of claim 1 wherein the bacon and oil are moved at a rate of about 0.3 ft/min through the casing.

4. The process of claim 2 further comprising of injecting steam through the oil in the casing before the outlet end of the casing.

5. A process for cooking bacon into bacon bits, the process having a relatively high yield and comprising:

providing a casing for holding the bacon, the casing having an outlet end;

continuously supplying bacon and oil into the casing;

continuously moving the continuous supply of bacon and the oil through the casing;

heating the casing to a temperature sufficient to cook the bacon to form bacon bits in the casing as the bacon is continuously moved through the casing;

continuously discharging the oil in which the bacon is cooked from the casing;

continuously removing the bacon bits at the outlet end of the casing thereby producing cooked bacon bits with relatively high fat and relatively high moisture content.

6. The process of claim 5 further comprising the step of injecting steam through the oil during the cooking of the bacon.

* * * * *